United States Patent

[11] 3,603,862

| [72] | Inventors | Robert F. Chase<br>Lynchburg;<br>Ralph R. Sherman, Jr., Forest, both of, Va. |
|---|---|---|
| [21] | Appl. No. | 886,971 |
| [22] | Filed | Dec. 22, 1969 |
| [45] | Patented | Sept. 7, 1971 |
| [73] | Assignee | General Electric Company |

[54] IMPROVED BATTERY-CHARGING CIRCUIT WITH LOCKING AND RESETTING MEANS
13 Claims, 3 Drawing Figs.

[52] U.S. Cl. .................................................. 320/39,
320/22, 320/31
[51] Int. Cl. ..................................................... H02j 7/10
[50] Field of Search ........................................... 320/DIG. 2,
39, 40.31, 35, 36, 22, 23, 24

[56] References Cited
UNITED STATES PATENTS

| 3,114,095 | 12/1963 | Palmer | 320/DIG. 2 |
|---|---|---|---|
| 3,123,759 | 3/1964 | Grey | 320/TD UX |
| 3,241,029 | 3/1966 | Slomski | 320/TD UX |
| 3,308,306 | 3/1967 | Bagno | 320/39 X |
| 3,343,059 | 9/1967 | Kirk et al. | 320/TD UX |
| 3,369,165 | 2/1968 | Lozeau | 320/TD UX |
| 3,392,317 | 7/1968 | Eberts et al. | 320/TD UX |
| 3,412,308 | 11/1968 | Brown | 320/TD UX |
| 3,443,191 | 5/1969 | Medlar | 320/24 |
| 3,517,294 | 6/1970 | Ruben | 320/39 X |
| 3,517,295 | 6/1970 | Lapuyade | 320/39 X |

Primary Examiner—William H. Beha, Jr.
Assistant Examiner—John M. Gunther
Attorneys—James J. Williams, Frank L. Neuhauser, Oscar B. Waddell and Joseph B. Forman

ABSTRACT: A battery-charging circuit provides a main-charging current to a connected battery until the battery voltage reaches a selected magnitude, after which the charging circuit switches and provides a trickle-charge current to the battery. The charging circuit cannot provide main-charging current again until the battery is disconnected, and a battery subsequently connected to the charging circuit.

PATENTED SEP 7 1971　　　　3,603,862

INVENTORS:
ROBERT F. CHASE,
RALPH R. SHERMAN, JR.

BY James J. Williams
THEIR ATTORNEY.

IMPROVED BATTERY-CHARGING CIRCUIT WITH LOCKING AND RESETTING MEANS

BACKGROUND OF THE INVENTION

Our invention relates to an improved battery-charging circuit, and particularly to an improved battery-charging circuit that prevents overcharging a battery.

Some storage batteries, such as nickel-cadmium type batteries, have a terminal voltage that is inversely proportional to battery temperature. As such batteries are charged, their terminal voltage increases at first. However, as the charging continues, the battery temperature increases, and this increased temperature causes the battery terminal voltage to decrease thereafter. If voltage measurement is used to regulate the current, the decreased terminal voltage permits such a charging circuit to supply more charging current, with a further increase in battery temperature and decrease in battery terminal voltage. Unless the charging is stopped, the elevated temperatures will damage or destroy the battery. This situation is aggravated where, as usually the case, the battery is in a closed container (such as a radio case) while being charged. Such a container tends to prevent heat from being dissipated.

Accordingly, an object of our invention is to provide a new and improved battery-charging circuit.

Another object of our invention is to provide a battery-charging circuit that prevents excessive temperatures from occurring in a battery that has an inverse terminal voltage-battery temperature characteristic and that may be in a closed container.

One obvious way of properly charging and protecting such batteries of the inverse terminal voltage-battery temperature type is to provide manual means to stop the main charge and start a trickle charge at the desired time. However, many such batteries are used in equipment during a working day, then removed from the equipment, then charged overnight so as to be available for use the following morning. In such cases, no one may be present to switch the battery charger from a main charge to a trickle charge at the proper time so that the battery can be supplied with a trickle charge until it is needed.

Accordingly, another object of our invention is to provide a battery-charging circuit that provides a main-charging current, that then provides a trickle-charging current in response to a selected battery terminal voltage, and that does not switch back to the main-charging current condition again.

Another object of our invention is to provide a new and improved battery-charging circuit that can supply a main-charging current and then a trickle-charging current without human control or attendance, so that a battery, such as the nickel-cadmium type, can be fully charged in a convenient time interval.

Another object of our invention is to provide a new and improved battery-charging circuit that can provide a main charge and then a trickle charge with the assurance that the battery will not be damaged even though it may be in a closed container throughout the charge.

SUMMARY OF THE INVENTION

Briefly, these and other objects are achieved in accordance with our invention by a circuit having main-charging means for supplying a main current to a battery connected to the circuit. Trickle-charging means are also provided for supplying a trickle current to the battery. Switching means are connected to the main-charging means, and are arranged to have a normal condition that permits the main-charging means to supply main current to the battery. The switching means are also arranged to have a locked condition that causes the main-charging means to supply a reduced current to the battery in response to the battery terminal voltage exceeding a selected magnitude. Biasing means are connected to the switching means for maintaining the switching means in the locked condition after being switched, so that main-charging current cannot be subsequently applied to a battery even if its terminal voltage is reduced. Unlocking means are connected to the biasing means to render the biasing means inoperative in response to the battery being disconnected from the charging circuit, thereby permitting the switching means to return to the normal condition and to supply main current to another battery subsequently connected to the charging circuit.

DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
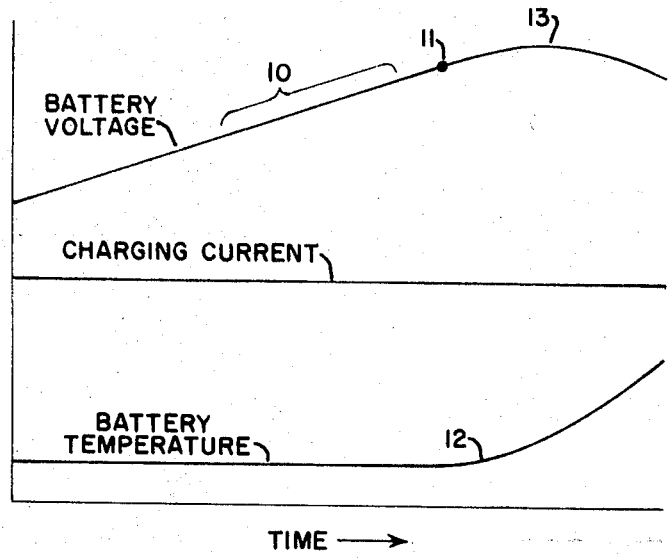
FIG. 1 shows curves illustrating the operation or characteristics of a storage battery having an inverse terminal voltage-temperature characteristic.

With reference to FIG. 1, we have shown curves illustrating the characteristics of a typical inverse terminal voltage-battery temperature type of battery, such as a nickel-cadmium type. FIG. 1 shows the relation of the battery-terminal voltage, the charging current, and the battery temperature with respect to time. If the applied charging current is substantially constant as illustrated, then as the battery receives charge, its terminal voltage initially increases in a fairly linear manner, as indicated by the portion 10 of the battery voltage curve. At some charge condition, however, such as illustrated by the point 11 on the battery voltage curve, the battery temperature begins to increase as indicated by the rising portion 12 of the battery-temperature curve. As the battery temperature continues to increase, the battery voltage reaches a peak or maximum at the point 13, and thereafter decreases. Even if the charging current is held constant, the battery voltage continues to decrease, and the battery temperature tends to increase. If the battery is in a closed container, as it usually is, the temperatures rise to fairly high values in a relatively short time. And, these high temperatures will damage or destroy the battery. An attempt to decrease the elevated temperatures by reducing the charging current would require a longer time to charge the battery. And even if the battery-charging circuit is provided with voltage sensing means for reducing the charging current, an erroneous indication is given after the battery is charged to the point where its voltage begins to decrease. With a decreased battery voltage, such a charging circuit would tend to provide increased charging current. So in this case, the battery will also be damaged or destroyed.

In accordance with our invention, we provide a battery charging circuit which provides a constant main-charging current until the battery voltage reaches a selected magnitude. Thereafter, our charging circuit provides only a trickle-charging current which, under ordinary conditions, does not cause such an increase of battery temperature that the battery can be damaged or destroyed. In addition, our charging circuit is arranged so that it does not permit the main-charging current to be supplied again, despite a subsequent decrease in battery voltage. Instead, our circuit provides a latching or locking condition such that one a selected battery voltage is reached, only trickle-charging current can be provided. When the battery is removed, our charging circuit is unlatched or unlocked so that when a subsequent battery is placed in our charging circuit, the main-charging current can be provided to the subsequent battery with the same protection just described.

Figure 2:
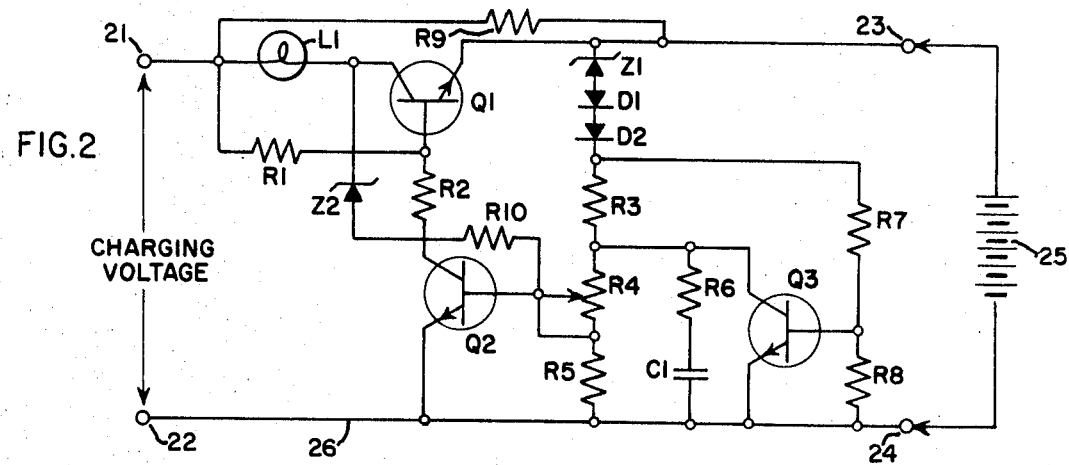
FIG. 2 shows a schematic diagram of a preferred embodiment of a battery-charging circuit in accordance with our invention.

FIGURE 2 shows a schematic diagram of a preferred embodiment of the battery-charging circuit in accordance with our invention. The battery-charging circuit is provided with first and second terminals 21, 22 to which a suitable voltage source can be connected to supply battery current. The battery-charging circuit also includes third and fourth terminals 23, 24 to which a battery 25 can be connected for charging. In our charging circuit, the second terminal 22 is directly connected to the fourth terminal 24 by a suitable bus 26. The first terminal 21 is connected to the third terminal 23 through a main-charging current path comprising a current-limiting incandescent lamp L1 and the collector-emitter path of a main current, NPN-type transistor Q1. The first terminal 21 is also connected to the third terminal 23 by a trickle-charging current path comprising a resistor R9.

The transistor Q1 is biased in a normally conductive condition by a bias resistor R1 connected between the first terminal 21 and the base of the transistor Q1. If the battery 25 is connected to the terminals 23, 24, the transistor Q1 begins to conduct so that a main-charging current flows from the first terminal 21 through the current-limiting lamp L1 and the collector-emitter path of the transistor Q1 to the terminal 23. A trickle charging current also flows from the terminal 21 through the resistor R9 to the terminal 23. A return path for these currents is provided from the terminal 24 to the terminal 22 by the bus 26.

A voltage-reference circuit is connected between the third terminal 23 and the bus 26. The circuit comprises a Zener diode rectifier FIG. temperature-compensating diode rectifiers D1, D2, a resistor R3, an adjustable potentiometer R4, and a resistor R5. A suitable voltage is selected from this circuit by the adjustable tap or arm on the potentiometer R4, and is applied to the base of a switching, NPN-type transistor Q2. A connection may be made from the movable tap to the junction of the resistors R4, R5 in order to provide good operation of the potentiometer R4. The collector of this transistor Q2 is connected through a resistor R2 to the base of the transistor Q1, and the emitter of this transistor Q2 is connected directly to the bus 26. Another voltage from this voltage-reference circuit is derived from the junction of the rectifier D2 and the resistor R3, and is applied to a voltage divider comprising two resistors R7, R8 connected between that junction and the bus 26. The voltage at the junction of the resistors R7, R8 is applied to the base of an unlocking NPN-type transistor Q3. The collector of this transistor Q3 is connected to the junction of the resistor R3 and the potentiometer R4, and the emitter of this transistor Q3 is connected to the bus 26.

A regenerative or positive feedback circuit is provided for the switching transistor Q2 by a Zener diode rectifier Z2 and a resistor R10 serially connected between the collector of the transistor Q1 and the base of the transistor Q2. And, a time-delay circuit is provided for the transistor Q3 by a resistor R6 and a capacitor C1 connected between the collector and emitter of the transistor Q3 to prevent unlocking for a selected time, in the order of 30 milliseconds, as will be explained.

Figure 3:
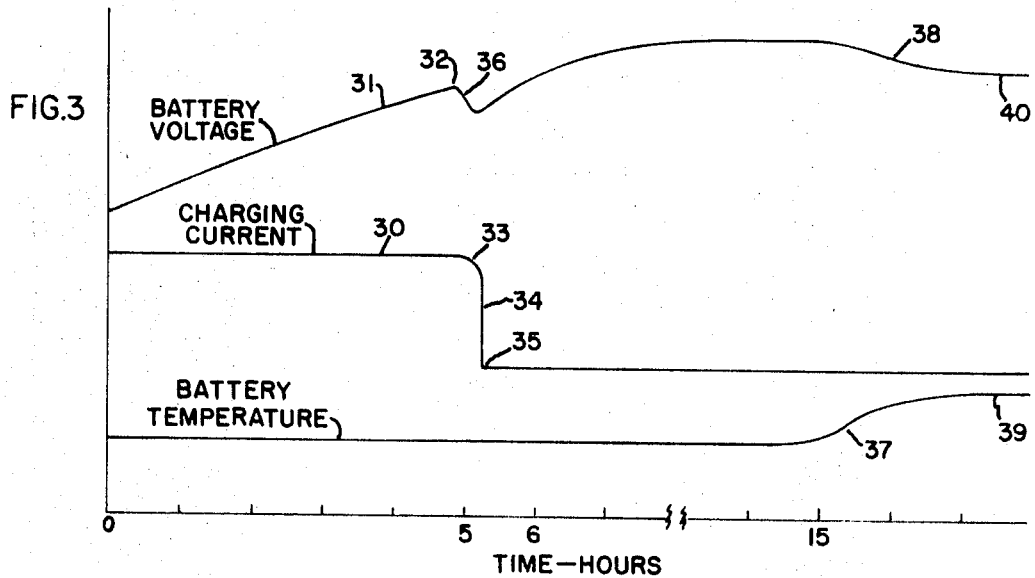
FIG. 3 shows curves illustrating the operation of our battery-charging circuit of FIG. 2.

The operation of our battery-charging circuit shown in FIG. 2 will be explained in connection with the curves shown in FIG. 3. The curves of FIG. 3 have different Y axis scales showing the relation of the terminal voltage of a six-cell nickel-cadmium battery, the charging current, and the temperature of the battery as they vary with respect to a common X axis representing time. With a suitable charging voltage applied to the first and second terminals 21, 22, the battery 25 to be charged is connected to the third and fourth terminals 23, 24 at a time zero hours. The resistor R1 biases the transistor Q1 so that it conducts a main-charging current, limited by the lamp L1. In addition, the trickle-charging current flows through the resistor R9. The total-charging current has a magnitude represented by the portion 30 of the charging-current curve. As the charging current continues to flow, the battery voltage increases as indicated by the portion 31 of the battery-voltage curve, but the battery temperature remains substantially constant during this time. After the battery 25 has been charged for a suitable length of time, typically around 5 hours, its voltage increases to a magnitude indicated by the point 32.

This point 32 represents the magnitude which causes the Zener diode rectifier Z1 to break down and begin to conduct current. This current flows through the Zener diode FIG. the diodes D1, D2, the resistor R3, the potentiometer R4, and the resistor R5. This current supplies a voltage to the base of the transistor Q2 so that current is diverted from the base of the transistor Q1 and flows through the resistor R2 and the collector-emitter path of the transistor Q2. This diverted current reduces the main-charging current flowing through the transistor Q1, as indicated by the downward-sloping portion 33 of the charging-current curve. As more current is diverted by the resistor R2 and the transistor Q2, the transistor Q1 conducts very little current with the result that its collector voltage becomes relatively high. This relatively high voltage causes the regenerative Zener diode Z2 to break down and to apply this relatively high voltage through the resistor R10 to the base of the transistor Q2. This causes the transistor Q2 to saturate or conduct heavily, and switches the transistor Q1 off. This switching occurs approximately 15 minutes after the Zener diode Z1 begins to conduct, and is indicated by the rapidly falling portion 34 of the charging-current curve. The curve stops or bottoms at the point 35 which represents the magnitude of trickle-charging current supplied by the resistor R9. During switching, the battery voltage goes through a slight drop as indicated by the portion 36 of the voltage curve, and thereafter begins to increase toward a maximum value. At this point, the battery has received approximately 70 percent of its full charge in approximately 5 hours.

The trickle-charging current continues to be supplied to the battery 25, and after approximately 15 hours, the battery is substantially fully charged. After the battery is fully charged, its temperature begins to increase as indicated by the portion 37 of the battery-temperature curve. This causes a corresponding decrease in the battery voltage, as indicated by the portion 38 of the battery-voltage curve. Equilibrium is reached after approximately 17 hours when the battery temperature stabilizes as indicated by the portion 39. The stable temperature causes the battery voltage to stabilize also as indicated by the portion 40. Thus, our battery-charging circuit is particularly well suited or adapted to charging a battery of the inverse battery voltage-battery temperature type, and supplies approximately 70 percent of the battery charge in 5 hours, and substantially 100 percent of the battery charge after 15 hours. This particular time is variable, but is desirable where a battery is connected to the charger at the end of a working day for use the following morning.

When switching occurs (the transistor Q2 turns on and the transistor Q1 is turned off), the voltage at the collector of the transistor Q1 becomes relatively positive so that the Zener diode Z2 is kept in a conductive condition. This positive voltage, supplied through the Zener diode Z2 and the resistor R10, locks or holds the transistor Q2 in a conductive condition. This in turn prevents base current from flowing to the transistor Q1, and thus locks or holds the transistor Q1 turned off. This locked condition is maintained until the battery 25 is removed. When the battery 25 is removed, the voltage at the third terminal 23 becomes much more positive, almost equaling the voltage at the first terminal 21, since there is only a small current flow through and a small voltage drop across the resistor R9. This positive voltage causes sufficient current to flow through the Zener diode Z1, the rectifiers D1, D2, and the resistors R7, R8, to provide base current to the transistor Q3. The transistor Q3 conducts so that the voltage at the junction of the resistor R3 and the potentiometer R4 becomes substantially zero. This relatively low voltage turns the transistor Q2 off and, in effect, unlocks or resets the charging circuit. Thus, when another battery is connected to the terminals 23, 24, the transistor Q1 can conduct and supply the main charging current.

The capacitor C1 and the resistor R6 provide a shunt-current path for the base of the transistor Q2. As a battery is inserted, monetary contact may be made with the terminals 23, 24, so that the transistor supplies main current and is then turned off because contact is broken or lost. This would cause an increased voltage at the terminal 23, and turn on the transistor Q2, thus switching and locking the circuit before the desired time. Such a condition is prevented by the shunting circuit (the resistor R6 and the capacitor C1) which diverts the momentary surge of current and prevents the transistor Q2 from being turned on until the capacitor C1 is charged. A suitable time constant for this shunt circuit is 30 milliseconds. Similarly, short voltage transients at the terminal 23 cannot cause erroneous switching and locking.

It will thus be seen that our invention provides a new and improved battery charging circuit which provides good charging conditions for the inverse battery voltage-battery temperature type of storage battery. The circuit of FIG. 2 was constructed and operated with a six-cell nickel-cadmium battery (having a nominal voltage of 7.5 volts), and provided substantially 70 percent of charge from a completely discharged battery in approximately 5 hours, and provided substantially 100 percent charge in 15 hours. These charging rates are ideal for the ordinary battery uses, such as for a portable radio which is used during a working day and set aside until the following morning. While we have shown only one embodiment of our invention, persons skilled in the art will appreciate that modifications may be made. For example, various current-limiting devices may be used in place of the lamp L1; and the temperature-compensating rectifiers D1, D2 may be omitted or replaced by a single rectifier. Therefore, while our invention has been described with reference to a particular embodiment, it is to be understood that modifications may be made without departing from the spirit of our invention or from the scope of the claims.

What we claim is:

1. An improved battery charging circuit comprising:
   a. main-charging means for supplying a main current to a battery connected to said charging circuit;
   b. trickle-charging means for supplying a trickle current to said battery;
   c. switching means connected to said main-charging means, said switching means having a normal condition that permits said main-charging means to supply said main current to said battery, and having a switched condition that causes said main-charging means to supply a reduced current to said battery in response to said battery having a voltage that exceeds a selected magnitude;
   d. locking means connected to said switching means for maintaining said switching means in said switched condition after being switched;
   e. and resetting means connected to said locking means for rendering said locking means inoperative in response to said battery being disconnected from said charging circuit, thereby permitting said switching means to return to said normal condition so that said main-charging means can supply main current to a battery connected to said charging circuit.

2. The improved battery-charging circuit of claim 1 wherein said main-charging means include a current-limiting device.

3. The improved battery-charging circuit of claim 1 wherein said switched condition of said switching means causes said main-charging means to supply substantially no current to said battery in response to said battery having a voltage that exceeds a selected magnitude.

4. The improved battery-charging circuit of claim 1 wherein said switching means have delay means to prevent said switching means from switching to said switched condition until said battery voltage exceeds said selected magnitude for a selected time.

5. The improved battery-charging circuit of claim 1 wherein said switched condition of said switching means causes said main charging means to supply substantially no current to said battery in response to said battery having a voltage that exceeds a selected magnitude, and wherein said switching means have delay means to prevent said switching means from switching to said switched condition until said battery voltage exceeds said selected magnitude for a selected time.

6. An improved circuit for charging a battery comprising:
   a. first and second terminals for connection to a suitable source of charging current;
   b. third and fourth terminals for connection to a battery to be charged;
   c. first means connecting said second and fourth terminals;
   d. second means having a main current path and a control terminal, said main current path being connected between said first and third terminals for supplying a main charging current to a connected battery;
   e. third means connected between said first and third terminals for supplying a trickle-charging current to a connected battery;
   f. fourth means connected to said control terminal for normally causing said second means to conduct a main-charging current through said main-current path;
   g. fifth means connected to said third terminal and to said control terminal for effecting a reduction of said main-charging current in response to a voltage of selected magnitude at said third terminal;
   h. and sixth means connected to said fifth means for rendering said fifth means inoperative in response to the absence of a battery between said third and fourth terminals, and thereby permit said second means to supply a main-charging current again.

7. The improved circuit of claim 6 wherein said main current path has a current-limiting device therein.

8. The improved circuit of claim 6 wherein said fifth means effects a reduction of said main-charging current to substantially zero in response to a voltage of selected magnitude at said third terminal.

9. The improved circuit of claim 6 wherein said fifth means have delay means to prevent reduction of said main-charging current until said voltage exceeds said selected magnitude for a selected time.

10. The improved charging circuit of claim 6 wherein said fifth means effects reduction of said main-charging current to substantially zero in response to a voltage of selected magnitude at said third terminal, and wherein said fifth means have delay means to prevent said reduction of main-charging current until said voltage exceeds said selected magnitude before a selected time.

11. An improved battery-charging circuit comprising:
    a. first and second terminals for connection to a charging source;
    b. third and fourth terminals for connection to a battery to be charged;
    c. first means connecting said second and fourth terminals;
    d. a first current-control device having a current path and a control terminal;
    e. means connecting said current path of said first device between said first and third terminals;
    f. bias means connected between said control terminal of said first device and said first terminal;
    g. a trickle-charging impedance connected between said first and third terminals;
    h. a second current-control device having a current path and a control terminal;
    i. means connecting said current path of said second device between said control terminal of said first device and said first means;
    j. a voltage-reference circuit connected between said second and fourth terminals;
    k. means connecting said control terminal of said second device to a selected point on said voltage reference circuit;
    l. a third current control device having a current path and a control terminal;
    m. means connecting said current path of said third device between a selected point on said voltage-reference circuit and said first means to shunt the voltage applied to said control terminal of said second device;
    n. and means connecting said control terminal of said third device to a selected point on said voltage-reference circuit.

12. The improved battery-charging circuit of claim 11 and further comprising a capacitor connected to said voltage-reference circuit for shunting the voltage applied to said control terminal of said second device.

13. The improved battery charging circuit of claim 11 and further comprising regenerative means connected between said first terminal and said control terminal of said second device.